C. W. ISBELL.
Scrubber for the Manufacture of Gas.

No. 221,566. Patented Nov. 11, 1879.

2 Sheets—Sheet 2.

C. W. ISBELL.
Scrubber for the Manufacture of Gas.

No. 221,566. Patented Nov. 11, 1879.

Witnesses
John Becker

Inventor
Chas. W. Isbell

UNITED STATES PATENT OFFICE.

CHARLES W. ISBELL, OF NEW YORK, N. Y.

IMPROVEMENT IN SCRUBBERS FOR THE MANUFACTURE OF GAS.

Specification forming part of Letters Patent No. 221,566, dated November 11, 1879; application filed August 5, 1879.

*To all whom it may concern:*

Be it known that I, CHARLES W. ISBELL, of the city and State of New York, have invented certain new and useful Improvements in Scrubbers for the Manufacture of Gas, of which the following is a description, reference being had to the accompanying drawings, forming part of this specification.

One object of this invention is to provide for a very thorough and uniform wetting of the scrubbing-surfaces of a gas-scrubber with a small quantity of water; and to this end one part of the invention consists in the combination, with a gas-scrubber, of a rotary water-distributing apparatus, a rocking water-box for the delivery of water intermittently to the said rotary distributing apparatus, and mechanism whereby the said water-box is by its own movement made to impart rotary motion to the said distributing apparatus in a regular intermittent manner.

The invention also consists in a combination, with the shell of the scrubber, of detachable perforated water-distributing arms and means for facilitating the connection of said arms with their supply-pipe within the scrubber.

Figure 1:
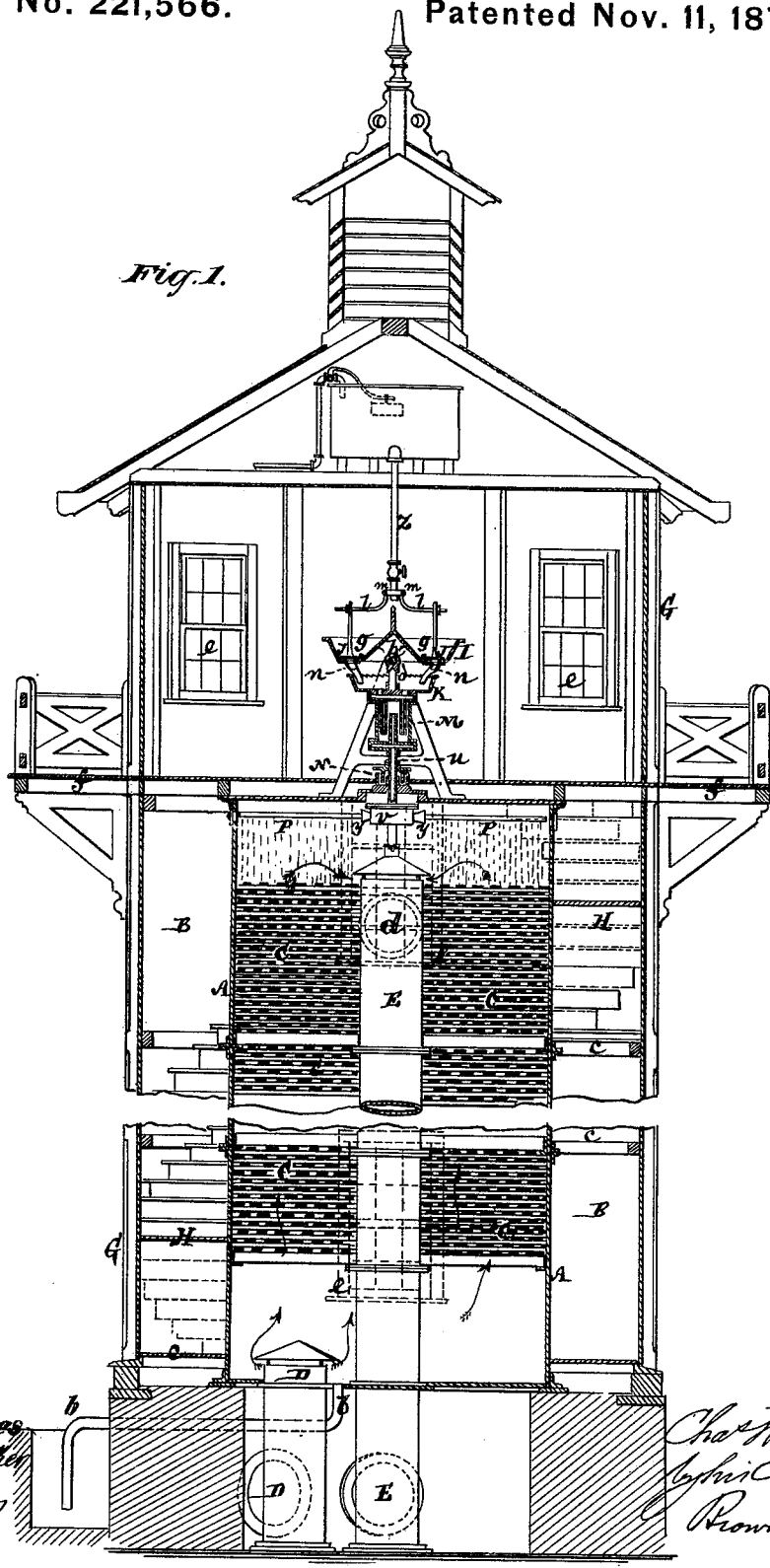
Figure 2:
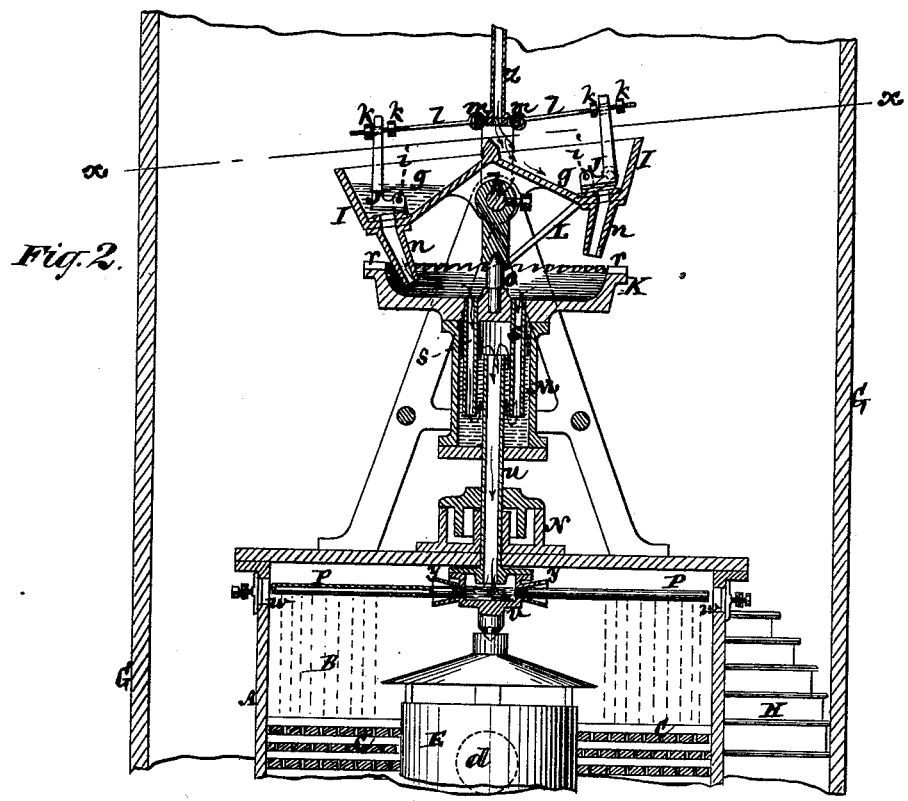
Figure 3:
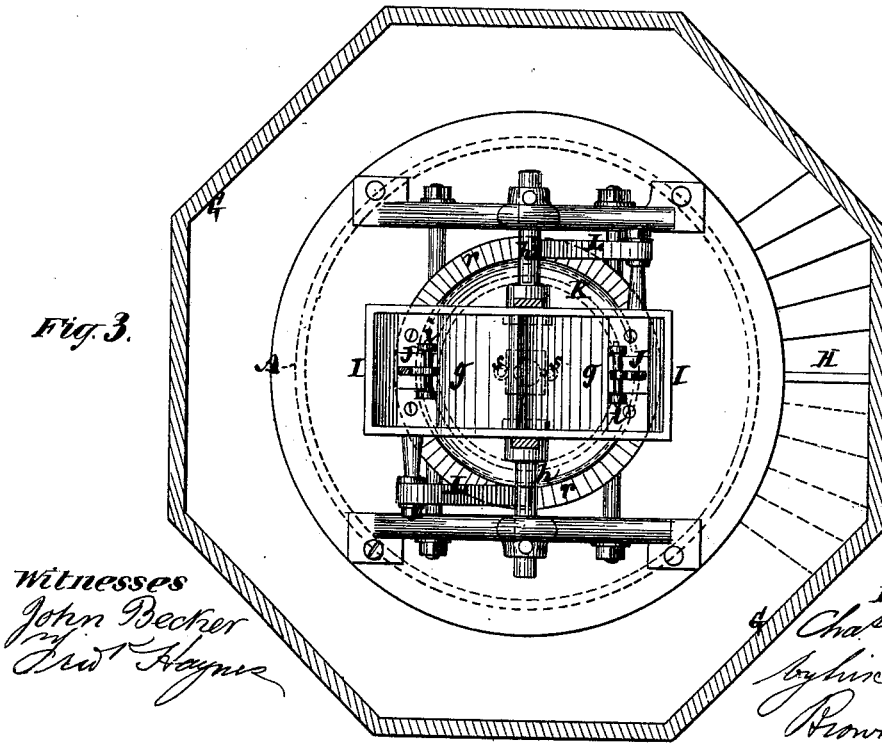

In the accompanying drawings, Figure 1 represents a broken sectional elevation of a gas-scrubber constructed in accordance with the invention; Fig. 2, a sectional elevation, upon a larger scale, of the upper portion of the scrubber, in part, and the water-distributing mechanism contained therein; and Fig. 3, a transverse section of the same on the line $x$ $x$ in Fig. 2.

A is the shell of the scrubber, which may be of any desired height, and is constructed in sections B B, of which there may be several, arranged one above the other, and containing perforated trays C, resting on each other within said sections on the open-work floors of the latter, for the gas, as it is introduced by a pipe, D, below and rises through the scrubber, to be thoroughly distributed and brought into contact with the wetted surfaces and water descending through the scrubber, to absorb the ammonia and other impurities from the gas, as in the case of other wet gas-scrubbers. Instead of trays, the shell A, which may be of sheet metal, may be packed with furze or broken materials of various kinds, if desired.

E is the downward-discharge pipe for the gas after it has been washed by its upward passage through the scrubber, and $b$ a pipe for running off the ammoniacal liquor.

G is the house, which may be of wood, and within which the shell A is arranged. It, also, is divided up into sections corresponding with the sections of the shell A, and is of sufficiently large interior dimensions to provide for floors or galleries $c$ outside of or around the shell. These galleries or floors may be reached consecutively or in regular order from below by a series of stairways, H, arranged on opposite sides alternately of the house for each succeeding floor, so that a person passing from one floor to another will have to pass from one side of the house to the other, and in so doing will pass man-holes $d$ in the shell. These man-holes provide for getting at the trays and inspecting the condition of the latter, and of removing any obstructions which may collect in the shell.

The house G may be provided, as usual, with a ventilator at top, and with windows $e$ $e$; also, with an outside gallery, $f$, for gaining access to the mechanism by which the water is distributed.

The water to be distributed through the scrubber may be supplied either from a tank above or by a pump from below, or from a main, under pressure or otherwise, and is conducted by a pipe, $z$, alternately into each of two compartments, $g$ $g$, of a tilting box, I, arranged to rock upon a horizontal shaft or axis, $h$, which is intermediate of the length of the box or between the compartments $g$ $g$ of the latter. Accordingly as said box is tilted to one side or other of its axis $h$ will water be discharged from its one compartment $g$ and be admitted to the opposite compartment $g$ by reason of said box, as it commences to tilt and expose either compartment $g$ to the incoming water, opening and closing discharge-valves J J, respectively, in the compartments $g$ $g$. These valves are pivoted at $i$ $i$ to or within the compartment $g$ $g$, and have their opening and closing actions controlled as said box is tilted, consequent on the weight of water in either compartment $g$, by adjustable tappets or nuts $k\ k$ on rods $l$, having fixed points of attachment $m$; and not until a certain weight of water has accumulated in either compartment $g$ will the box I be tilted, so that the action of said box as regards admitting water to the scrubber is intermittent. This is important, inasmuch as it provides for a more thorough wetting of a given surface in the scrubber by a given quantity of water than can be obtained by a continuous action; and by a proper construction of the water-distributing arms or attachments the scrubber is effectually wet over all its surfaces exposed to the gas. Thus, as the water is discharged, after an interval or lapse of two or three minutes, more or less, from either compartment $g$ by the intermittent action of the box I, through one or other of two spouts, $n\ n$, it passes down or into a basin, K, which has an intermittent rotation about a vertical axis, $o$, corresponding to or in the same timely relation with the intermittently-tilting box I, and through the agency of the latter, by means of pawls L, carried by said box on opposite sides of its axis and on opposite sides of the axis of the basin, and arranged to engage with a circular ratchet-wheel or rack, $r$, on said basin. The water thus intermittently delivered into the intermittently-rotating basin K passes down through ducts $s\ s$ in a water-seal trap, M, fast to the basin, so as to intermittently rotate with it, and from thence by a pipe, $u$, secured to said trap, through a mercury seal-trap, N, into two or more perforated hollow distributing-arms, P P, arranged to occupy a horizontal, or approximately horizontal, position, and fitted to screw into a box, $v$, at the lower end of the intermittently-rotating pipe $u$. These arms P P are within the upper sprinkling or tray section, B, of the scrubber, and, though here shown as perforated below, preferably have their distributing-perforations along their top, to retain within said arms any sediment contained within the water entering the arms. It is also desirable that the perforations in either one arm P should be out of concentric relation with the perforations in the other arm or arms, so as to vary the distributing action of the arms over the area or surface of the scrubber to be wet.

As the arms P P require to be cleaned from time to time, provision is made for taking them out and re-entering them through suitably-closed apertures $w\ w$ in the side of the shell.

Furthermore, as the section of the scrubber within which said arms are arranged is dark, and it might be difficult to replace them in the box $v$, or connect them with the intermittently-rotating pipe $u$, conical or flaring mouth-shaped guides or projections $y\ y$ are arranged around the screw-holes, into which the inner ends of the arms fit or screw, to direct said arms to their places at their connection with the intermittently-rotating pipe $u$ or box $v$, fast to said pipe.

I am aware that other means have been devised for reducing the quantity of water used in gas-scrubbers, and thereby obtaining a concentrated ammoniacal liquor; but such means I do not claim.

What I claim as my invention is—

1. The combination, with a gas-scrubber, of a rotating water-distributing apparatus, a rocking or tilting water-box for the delivery of water intermittently to the said rotary distributing apparatus, and mechanism whereby the said water-box is by its own movement made to impart rotary motion to the said distributing apparatus in an intermittent manner, substantially as herein described.

2. The combination, with the tilting water-box I, having compartments $g\ g$ on opposite sides of its axis, the pawls L L, the intermittently-rotating basin K, actuated by said pawls, and the perforated water-distributing arms P P, substantially as specified.

3. The combination, with the shell A, of the detachable perforated water-distributing arms P, the rotating pipe or hollow shaft $u$, for supplying water to said arms, and the conical or flaring mouth-shaped guides $y$, for facilitating the connection of said arms with said shaft, essentially as described.

CHAS. W. ISBELL.

Witnesses:
   HENRY T. BROWN,
   FREDK. HAYNES.